US009439069B2

(12) United States Patent
Sharaga et al.

(10) Patent No.: US 9,439,069 B2
(45) Date of Patent: Sep. 6, 2016

(54) SUBSCRIBER IDENTITY MODULE PROVIDER APPARATUS FOR OVER-THE-AIR PROVISIONING OF SUBSCRIBER IDENTITY MODULE CONTAINERS AND METHODS

(71) Applicant: Intel IP Corporation, Santa Clara, CA (US)

(72) Inventors: Avishay Sharaga, Bet Nehemya (IL); Danny Moses, Ruet (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/573,132

(22) Filed: Dec. 17, 2014

(65) Prior Publication Data

US 2016/0183086 A1   Jun. 23, 2016

(51) Int. Cl.
*H04M 1/66* (2006.01)
*H04W 12/06* (2009.01)
*H04W 8/02* (2009.01)

(52) U.S. Cl.
CPC ............... *H04W 12/06* (2013.01); *H04W 8/02* (2013.01)

(58) Field of Classification Search
CPC ............................ H04W 12/06; H04L 63/062
USPC ................... 455/411, 558; 380/259, 247, 46; 713/163, 171
See application file for complete search history.

(56) References Cited

U.S. PATENT DOCUMENTS

2012/0233685 A1* 9/2012 Palanigounder ...... H04W 12/06 726/9
2015/0180653 A1* 6/2015 Nix .................. H04W 52/0235 380/259

* cited by examiner

*Primary Examiner* — Kiet Doan
(74) *Attorney, Agent, or Firm* — Schwegman Lundberg & Woessner, P.A.

(57) ABSTRACT

A SIM provider apparatus is disclosed that is configured to generate a first service provider key (SPK) based on master attributes at the SIM provider apparatus. The master attributes, including a master key, are shared by both the SIM provider apparatus and a SIM container. The SIM provider apparatus is further configured to verify a second SPK, received from the SIM container and generated based on the master attributes in the SIM container, is the same as the first SPK. The SIM provider apparatus then stores the first SPK in response to the first SPK being the same as the second SPK.

11 Claims, 5 Drawing Sheets

Fig. 5

SUBSCRIBER IDENTITY MODULE PROVIDER APPARATUS FOR OVER-THE-AIR PROVISIONING OF SUBSCRIBER IDENTITY MODULE CONTAINERS AND METHODS

TECHNICAL FIELD

Embodiments described herein generally relate to both wireless and wired networks. Some embodiments relate generally to provisioning subscriber identity module (SIM) application credentials. Some embodiments relate to cellular networks including 3GPP, LTE, WiMAX or other cellular networks that uses SIM applications to authenticate subscribers.

BACKGROUND

A SIM (e.g., uSIM, cSIM, iSIM) is a factory provisioned application on a universal integrated circuit card (UICC) that is typically referred to in the art as a SIM card. A user may insert a SIM card into user equipment (UE) in order to identify the user in a service provider's network.

Dynamically provisioning a SIM application over a secure network has been attempted with limited success. Problems with such a process include legacy support, UICC credentials ownership, and migration between cellular service providers. Additionally, SIM card manufacturers would also lose business if SIM applications were provisioned over the air when the UE was used in a different cellular network instead of the user inserting a new SIM card.

There are general needs for improved methods for provisioning SIM application credentials over the air.

DETAILED DESCRIPTION

A large number of mobile electronic devices (e.g., mobile telephones, tablet computers) as well as non-electronic devices (e.g., vehicles, vending machines, home appliances, smart power grid appliances) that include electronics, may have a need to be connected to the Internet (e.g., the Internet of Things) in order to communicate with a remote server. The Internet connection may be accomplished over a WiFi network or a cellular network. The cellular network may provide an Internet connection to these devices in locations that may not be able to be serviced by a WiFi access point (AP).

Each of the devices coupled to the Internet over the cellular network may use identification (unique to the service provider) provided by a SIM application. The SIM application may be located on a SIM card that is inserted in the device and contains the data used to uniquely identify the device to the cellular network. The SIM application may also be located in a different container.

Using the present technology, when an owner (i.e., operator, user) of one of these devices switches cellular network service providers, the SIM card typically is changed to another SIM card that is compatible with the new service provider. This may not be an issue for an owner of a cellular telephone in which the owner may simply remove the SIM card and replace it with the new card. However, if a user operates a large number of these devices, switching cellular network service providers may result in a costly burden to switch all of the SIM cards. If the SIM cards are soldered into the device, the burden to switch service providers becomes even greater for that user. Thus, it would be beneficial to perform remote (e.g., over-the-air, over wireline) provisioning of cellular SIM applications to devices (e.g., user equipment (UE)) in a secure manner that maintain the "Security" properties of the credentials as customary in today business practices.

The subsequently described embodiments perform SIM application credential remote (e.g., over-the-air (OTA)) provisioning that utilizes legacy network protocols for SIM-based authentication using a new business entity that, from the cellular network perspective, appears identical to a home network. The embodiments use a master key, that is provisioned in the SIM Provider database and on the SIM container during manufacturing, and a service provider key that is derived from the master key, SIM provider attributes (e.g., M-IMSI), and service provider specific attributes (e.g., International Mobile Subscriber Identity (IMSI)). Using the key derivation function and adhering to the key hierarchy definitions, when the user wishes to register with a service provider or replace a service provider, a new service provider key is derived. In the initial connection to the new service provider, the connection operation is similar to a roaming connection where the SIM provider acts as the home network and the candidate service provider (i.e., new service provider) is the visited network. Thus, legacy protocols are used for the connection while the new service provider provisioning protocol is done over an Internet Protocol (IP) connection using a provisioning application that is network agnostic. After the new service provider key is derived, the connection to the new service provider is similar to a legacy operation.

The device may be defined herein as any device, mobile or stationary, that communicates over a channel (e.g., cellular network) and, thus, uses a unique identification with the wireless service provider (e.g., cellular operator). Such a device may include, but not be limited to, mobile telephones or other user equipment, computers, tablet computers, vehicles, smart grid appliances, or traffic signals.

Figure 1:
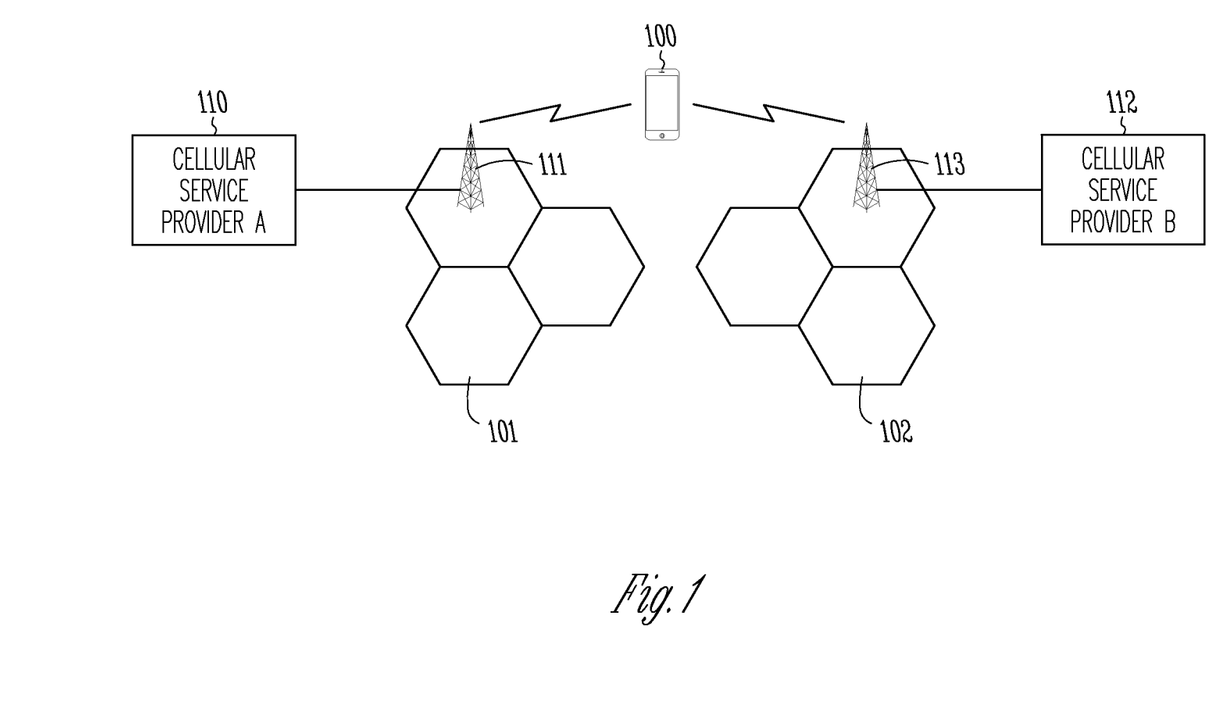
FIG. 1 illustrates an embodiment of a UE migrating between two radio access networks in accordance with some embodiments.

FIG. 1 illustrates an embodiment of a UE 100, in the form of a cellular mobile telephone, migrating between two radio access networks (RANs) 101, 102 in which the UE 100 is switching subscription from a first RAN 101 and a second RAN 102. In another embodiment, the UE 100 may simply wish to subscribe to a new service provider while communicating with the same RAN. FIG. 1 is one example of a system in which a SIM application may be provisioned over-the-air (OTA) in a mobile electronic device (e.g., UE) that switches operation from a first cellular network to a second cellular network.

The UE 100 initially communicates with cellular service provider A 110 through the base station 111 (e.g., eNodeB)

of the first cellular network 101. When the user of the UE 100 desires to switch operation from the first cellular network 101 to the second cellular network 102, a UE 100 SIM is provisioned OTA so that the UE may communicate with cellular service provider B 112 through the base station 113 (e.g., eNodeB). The SIM may be provisioned OTA as discussed subsequently with reference to FIG. 2.

Figure 2:
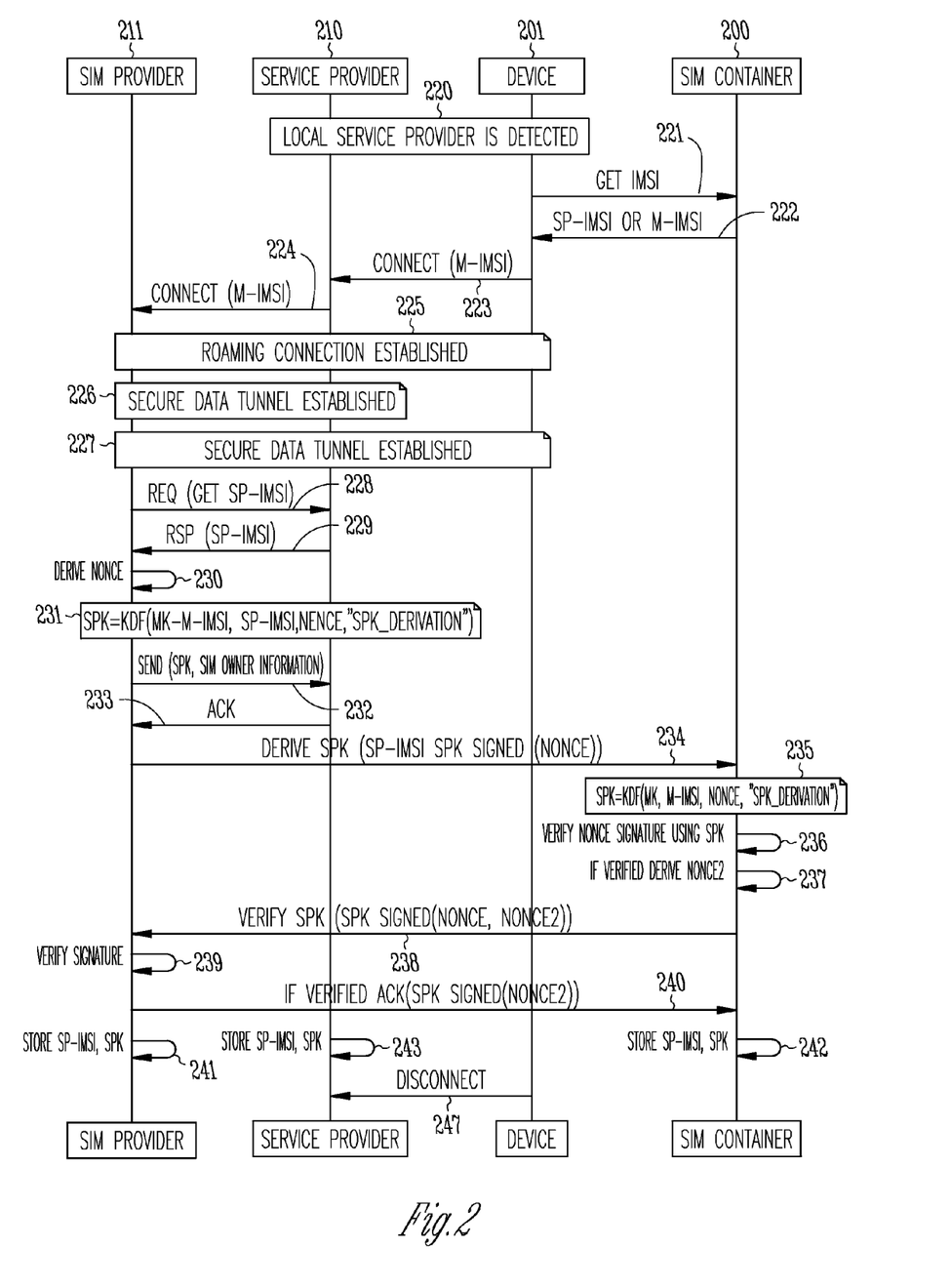
FIG. 2 illustrates a message flow diagram of an embodiment of over-the-air SIM provisioning including key derivation in accordance with some embodiments.

FIG. 2 illustrates a message flow diagram of an embodiment of OTA SIM provisioning including key derivation. The provisioning and key derivation is accomplished between three entities: device 201 having a SIM container 200, a network service provider 210, and a SIM provider 211 apparatus that may include servers, processing circuitry, and communication circuitry as disclosed subsequently in FIG. 5.

The device 201 may include any previously described device that communicates with a wireless network. The device 201 includes a SIM container 200. The SIM container 200 may be any permanent or removable device for storing data. For example, the SIM container 200 may include a SIM card, such as a UICC, that is insertable and/or removable into and/or from the device, a SIM card that is soldered into the device 201, a memory area of the device 201 in which the SIM application may be stored. The memory area may include a non-volatile memory area (e.g., flash).

SIM credentials in a SIM container 200 may be structured in two parts. A first part is a master IMSI (M-IMSI) which is an indication of the SIM identity. The master IMSI is structured from a service provider identification as well as a unique identification. A second part of the SIM credentials includes a master key that, once programmed, is never transmitted or read from the SIM container 200. Both the master IMSI and the master key are known to the SIM provider 211 and available to the network service provider and the device through the SIM container 200 and are used by the device to authenticate the device to the SIM provider 211 acting as a home network.

The network service provider 210 may include a legacy network service provider. For example, the network service provider 210 may be a cellular network service provider as illustrated in FIG. 1.

Figure 5:
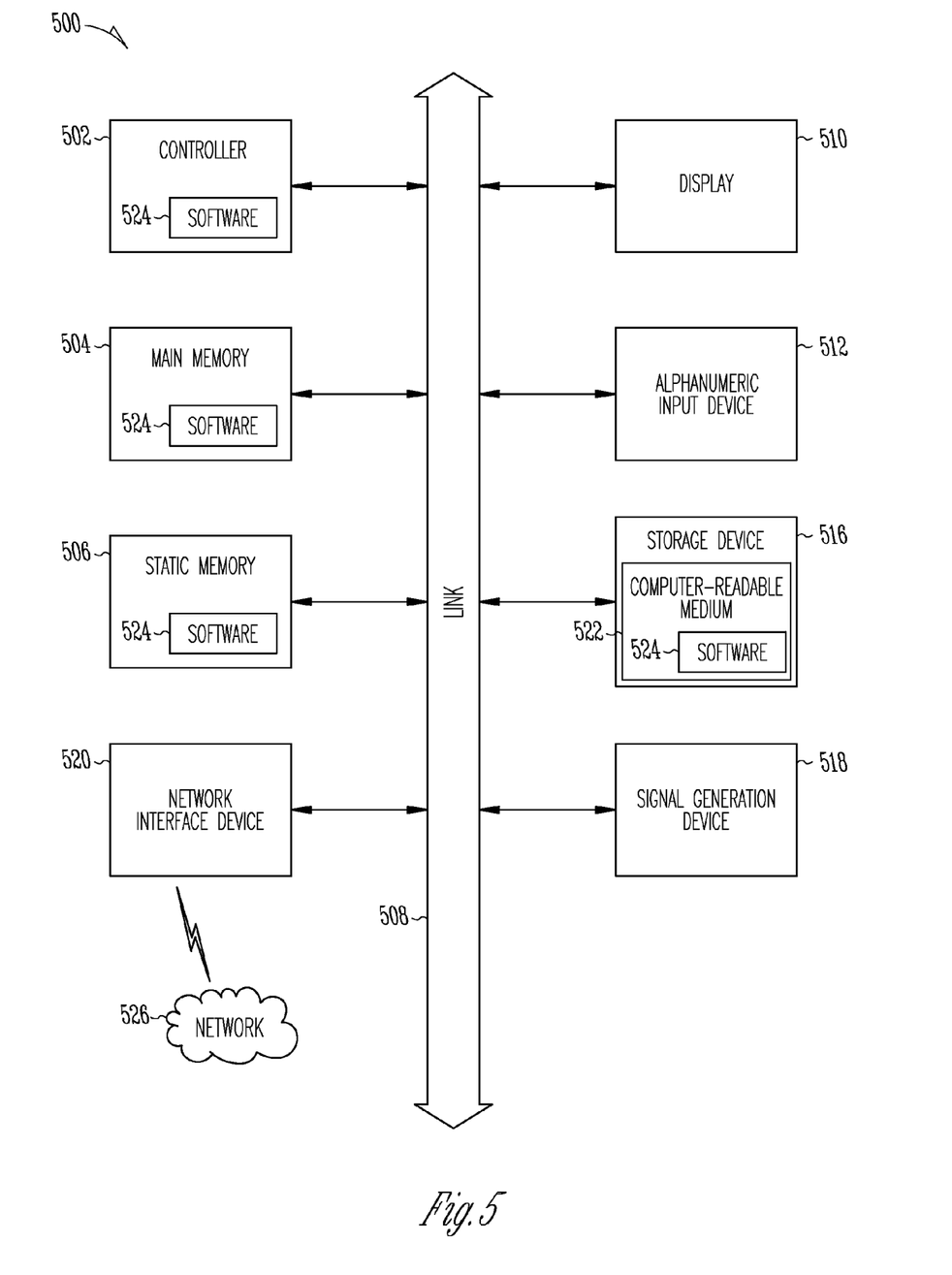
FIG. 5 illustrates a block diagram of an embodiment of a device in accordance with some embodiments.

The SIM provider 211 comprises an apparatus configured to provide the SIM container with master attributes as disclosed subsequently. These attributes (i.e., parameters) may be stored in the SIM provider database. In the illustrated embodiment, the SIM provider 211 is a separate apparatus from the local network service provider 201 and may include servers, controllers, and memory for databases as illustrated in FIG. 5 and described subsequently. The SIM provider 211 creates the nonce and uses it with the service provider IMSI, and other parameters, to derive the service provider key.

The parameters stored by the SIM provider 211 may include the master key (MK), and the master IMSI. Other embodiments may store other parameters in the SIM provider database. These parameters are used subsequently in the provisioning embodiment of FIG. 2.

The master key (MK) is the top level key for SIM operations. The master key is provisioned to the SIM container 200 by the SIM provider 211 during manufacture, initialization of the SIM container, or some other secure, non-over-the-air method.

The master IMSI (M-IMSI) is the IMSI that uniquely identifies the SIM provider 211. For example, the master IMSI may identify the SIM provider 211 for the home network in a roaming scenario. The SIM provider 211 may be thought of as a virtual service provider since it does not actually provide network operations to the device 201.

The service provider key (SPK) is the specific key assigned to the network service provider by the SIM provider, based on a derivation. This key is used for mutual authentication between the service provider network and the user and is derived from the master key, IMSIs, and nonce as described with reference to FIG. 2.

The service provider IMSI (SP-IMSI) is assigned by the service provider itself for newly provisioned devices. Since the IMSI identifies the service provider, it is assigned by the service provider from the IMSI pool.

The nonce is a randomly generated number that is involved in the service provider key derivation. Its purpose is to cause each newly derived key to be unique, even in the case where a subscriber re-subscribes to the same service provider.

Referring again to FIG. 2, at 220, the device 201 may detect a local network service provider 210. The Device 201 sends a command 221 to the SIM container 200 to get an IMSI. The SIM container 200 checks its database to determine if an IMSI for the service provider exists. At 222, the SIM container 200 responds to the device 201 with either the SP-IMSI or the M-IMSI. If the IMSI for the service provider exists, the SIM container 200 responds 222 to the device 201 with the SP-IMSI. If the IMSI for the service provider does not exist, the SIM container 200 responds 222 to the device 201 with M-IMSI.

At 223, the device 201 forwards the M-IMSI to the service provider 210. The service provider 210 receives the M-IMSI and determines that the received IMSI is not its own IMSI. The service provider 210 then forwards the M-IMSI to the SIM provider 211 at 224. A roaming connection is thus established, at 225, between the device 201, the SIM container 200, and the SIM provider 211 where the service provider network behaves as the visited network and the SIM provider network behaves as the home network. A secure data tunnel is established between the SIM provider 211 and the service provider 210 at 226. The secure data tunnel is established for securely exchanging sensitive key material between the service provider 210 and the SIM provider 211 (e.g., virtual service provider).

In an embodiment, a secure data tunnel is established at 227 between the SIM Provider 211 and Device 201. This tunnel is used to transfer sensitive information from the SIM Provider 211 to the Device 201 as described below. The secure tunnel is established using a key derived from the MK which is shared between the SIM Provider 211 and Device 201.

At 228, the SIM provider 211 requests an IMSI (e.g., SP-IMSI) from the service provider 210. The service provider 210 replies with the requested IMSI (e.g., SP-IMSI). At 230, the SIM provider 211 generates a nonce and uses the nonce and other parameters to derive the service provider key SPK.

At 231, the key derivation function (KDF) is performed by the SIM provider 211. The key derivation function may be indicated as SPK=KDF(MK, M-IMSI, SP-IMSI, nonce, "SPK_Derivation"). KDF may be any key derivation algorithm such as one or more Secure Hash Algorithms (e.g., SHA224, SHA256, SHA384, SHA512) or some other unidirectional key derivation function.

The resulting SPK is provided to the local network service provider 210 at 232 along with SIM owner information. The SIM owner information may include data such as credit card numbers, service level agreements, and/or other service provider specific SIM owner data.

At 233, the service provider 210 responds to the SIM provider 211 with an acknowledgement that the SPK was received. The key derivation function is also performed by the SIM container 200 using the same function (i.e., SPK=KDF(MK, M-IMSI, SP-IMSI, nonce, "SPK_Derivation")). The SIM provider 211 sends a command, at 234, to the SIM container 200 to derive the SPK. If a secure tunnel was established at 227, this command is inside the tunnel. The command includes the SP-IMSI as well as the nonce that was derived by the SIM provider 211. The SIM provider derived SPK is used to sign the nonce sent to the SIM container 200. Thus, the nonce is protected with a key for security purposes.

At 235, the SIM container 200 derives its own SPK with the above function and verifies, at 236, that the received nonce has been signed with the proper SPK as derived by the SIM provider 211. The SIM container 200 derives the SPK and signs the nonce and compares it with the signed nonce that was sent by the SIM Provider 211 in order to verify the nonce integrity.

If the nonce is verified by the SPK signature (i.e., both derived SPKs match), the SIM container 200 generates a second nonce (i.e., nonce2) at 237. At 238, the first nonce (i.e., nonce) and the second nonce (i.e., nonce2) are signed by the SPK derived by the SIM container 200 and transmitted back to the SIM provider 211 over the IP connection. The SIM provider 211, at 239, verifies the signature by comparing the signed nonce2 using its own copy of the SPK and compares the signatures for verification. If the signature is verified (i.e., the respective derived SPKs match) both the SIM provider 211 and the SIM container 200 now have the SPK. This is acknowledged by the SIM provider 211 transmitting an acknowledgement to the SIM container 200 at 240.

At 241-243, the SIM provider 211, the SIM container 200, and the service provider respectively store the SP-IMSI and the SPK. The device 201 may end the connection with the service provider 210 at 247.

It may be noted that the SIM container 200 may hold multiple tuples of (SPK, SP-IMSI) and thus be provisioned to multiple service providers concurrently. The device 201 may then connect to any of these service providers per policy.

Figure 3:
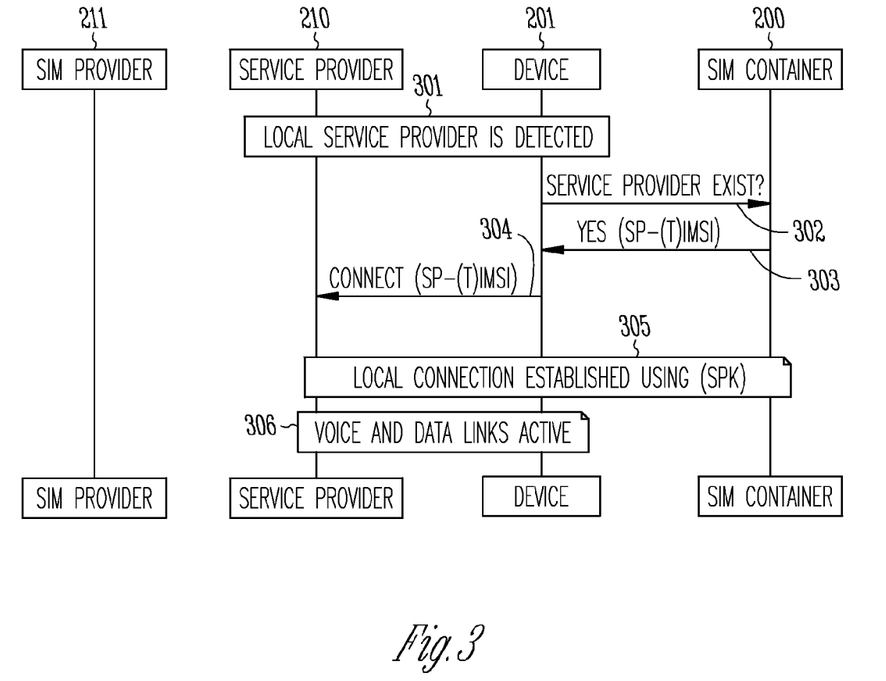
FIG. 3 illustrates a message flow diagram of an embodiment of a connection of a device to a cellular network in accordance with the embodiment of FIG. 2 in accordance with some embodiments.

Once the SIM container 200 has been provisioned for the new network, subsequent connection of the device (e.g., UE) with the network may proceed in a normal fashion but using the newly provisioned IMSI (or TIMSI—as is used in today's cellular networks). FIG. 3 illustrates a message flow diagram of an embodiment of the connection of the device to a cellular network in accordance with the embodiment of FIG. 2.

Since the SIM container 200 has already been provisioned in this embodiment, the SIM provider 211 no longer plays a role in the connection to the provisioned network. The device 201 begins by detecting the local service provider 210 at 301. The device queries the SIM container 200, at 302, as to whether the SIM container 200 has been provisioned with the network credentials. Since the OTA provisioning has already taken place, the SIM container 200 responds to the device 201, at 303, with an affirmative response. This response may include the service provider IMSI (i.e., network identity) that is stored in the SIM container 200.

At 304, the device then transmits the SP-(T)IMSI to the local network service provider 210. A connection is then established, at 205, between the service provider 210 and the SIM container 200 via the device 201. The voice and data links are now considered to be active at 306.

Figure 4:
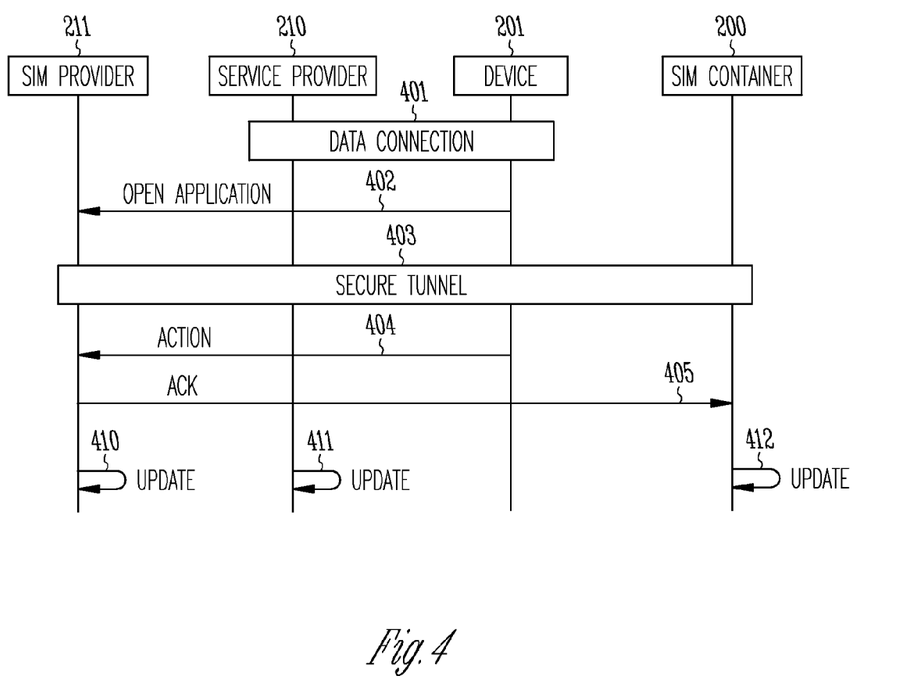
FIG. 4 illustrates a message flow diagram of an embodiment for managing already provisioned service providers in accordance with some embodiments.

Provisioned service providers may be managed by the SIM application stored in the SIM container 200. For example, the owner of the SIM container 200 may decide to cancel an already provisioned service provider. FIG. 4 illustrates a message flow diagram of an embodiment for managing already provisioned service providers.

FIG. 5 is a block diagram illustrating an apparatus in the example form of a device, a SIM provider apparatus, a UE, an access point (AP), and/or a cellular base station (e.g., eNodeB, eNB) such as illustrated in FIGS. 1-4. A set or sequence of instructions may be executed to cause the communication apparatus to perform any one of the methodologies discussed herein, according to an example embodiment.

In some embodiments, the communication apparatus operates as a standalone device or may be connected (e.g., networked) to other communication apparatuses. The communication apparatus may be a mobile communication device (e.g., cellular telephone, UE), a computer, a personal computer (PC), a tablet PC, a hybrid tablet, a personal digital assistant (PDA), or part of any device configured to execute instructions (sequential or otherwise) that specify actions to be taken by the communication apparatus. The term "processor-based system" shall be taken to include any set of one or more communication apparatuses that are controlled by or operated by a processor (e.g., a computer) to individually or jointly execute instructions to perform any one or more of the methodologies discussed herein.

The communication apparatus 500 may include at least one controller 502 (e.g., a central processing unit (CPU), a graphics processing unit (GPU) or both, processor cores, compute nodes, etc.), a main memory 504 and a static memory 506 that communicate with each other via a link 508 (e.g., bus). The communication apparatus 500 may further include a display unit 510 (e.g., video, LED, LCD) and an alphanumeric input device 512 (e.g., a keypad, keyboard). In one embodiment, the display unit 510 and input device 512 may be incorporated as one unit as a touch screen display. The communication apparatus 500 may additionally include a storage device 516 (e.g., a drive unit), a signal generation device 518 (e.g., a speaker), a network interface device 520, and one or more sensors (not shown). The network interface device 520 may include one or more radios (e.g., transmitters and receivers) coupled to one or more antennas in order to communicate over a wireless network channel 526.

The storage device 516 includes a computer-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the communication apparatus 500, with the main memory 504, static memory 506, and the processor 502 also constituting computer-readable media.

While the computer-readable medium 522 is illustrated in an example embodiment to be a single medium, the term "computer-readable medium" may include a single medium or multiple media (e.g., a centralized or distributed database, and/or associated caches and servers) that store the one or more instructions 524.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The instructions 524 may further be transmitted or received over the communications network 526 using a transmission medium via the network interface device 520 utilizing any one of a number of well-known transfer protocols (e.g., IP, TCP, UDP, HTTP). Examples of communication networks include a local area network (LAN), a wide area network (WAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying out instructions for execution by the communication apparatus, and includes digital or analog communications signals or other intangible medium to facilitate communication of such software. The network interface device may include one or more antennas for communicating with the wireless network.

The above-described embodiments provide multiple advantages over typical systems. For example, changes to network protocols are not necessary. From a device perspective, the above-described SIM looks identical to a legacy SIM since the difference is the internal functionality. The embodiments operate with all kinds of SIM containers, including detachable UICC, thus maintaining the UICC eco-system and supply chain. Changes to the UICC from belonging to the service provider to belonging to the user that buys it from a SIM provider may create new user real estate for storing data which is both device independent and service provider independent.

The above-described SIM functionality also supports multiple service providers with different service provider keys and IMSIs. Having this capability on a detachable UICC may open the way for UEs to adopt OTA provisioned SIM methodology The Abstract is submitted with the understanding that it will not be used to limit or interpret the scope or meaning of the claims. The following claims are hereby incorporated into the detailed description, with each claim standing on its own as a separate embodiment.

EXAMPLES

The following examples pertain to further embodiments.

Example 1 is a subscriber identity module (SIM) provider apparatus configured to: derive a first service provider key (SPK) based on master attributes at the SIM provider apparatus, wherein the master attributes include a master key and are shared by the SIM provider apparatus and a SIM container; sign a first nonce with the first SPK and transmit the signed first nonce to the SIM container; receive, from the SIM container, the first nonce and a second nonce; and verify that the received first and second nonces were signed with a second SPK.

In Example 2, the subject matter of Example 1 can further include wherein the SIM provider apparatus is further configured to store the SPK in response to a successful verification that the first and second nonces were signed by the SPK.

In Example 3, the subject matter of Examples 1-2 can further include wherein the master attributes comprise a master International Mobile Subscriber Identity (M-IMSI).

In Example 4, the subject matter of Examples 1-3 can further include wherein the SIM provider apparatus is further configured to derive the SPK by a key derivation represented by SPK=KDF(MK, M-IMSI, SP-IMSI, nonce, "SPK_Derivation").

In Example 5, the subject matter of Examples 1-4 can further include wherein the SIM provider apparatus is further configured to: compare a received signature of the first and second nonces, generated using the second SPK, with the signature of the first SPK, and the second nonce locally generated using the first SPK; and send an acknowledgement to the SIM container when the first SPK is the same as the second SPK.

In Example 6, the subject matter of Examples 1-5 can further include wherein the SIM provider apparatus is further configured to generate the first SPK with a unidirectional key derivation function.

In Example 7, the subject matter of Examples 1-6 can further include wherein the SIM provider apparatus is operably coupled to the device over a roaming connection.

In Example 8, the subject matter of Examples 1-7 can further include wherein the SIM provider apparatus is operably coupled to the SIM container through an Internet Protocol connection.

In Example 9, the subject matter of Examples 1-8 can further include wherein the SIM provider is further configured to send a command over the IP connection to the SIM container, wherein the command is configured to initiate generation of the second SPK in the SIM container.

In Example 10, the subject matter of Examples 1-9 can further include wherein the command comprises a service provider IMSI (SP-IMSI) and a first nonce generated by the SIM provider apparatus, wherein the SIM provider apparatus is further configured to sign the first nonce with the first SPK.

In Example 11, the subject matter of Examples 1-10 can further include wherein the SIM provider apparatus is further configured to receive the first nonce and a second nonce, derived by the SIM container, wherein the first and second nonces are signed by the second SPK.

In Example 12, the subject matter of Examples 1-11 can further include wherein the SIM container is a SIM card removable from the device, a universal integrated circuit card (UICC), a SIM card soldered into the device, a memory area of the device, or any secure container of the device.

Example 13 is a method for over-the-air provisioning of a subscriber identity module (SIM) container in a device by a SIM provider apparatus, the method comprising: establishing a roaming connection between the SIM provider apparatus and the device; establishing an Internet Protocol (IP) connection between the SIM provider apparatus and the SIM container; receiving a service provider International Mobile Subscriber Identity (SP-IMSI) from a local service provider; deriving a first nonce; deriving a first service provider key (SPK) from the first nonce and master attributes stored in the SIM provider apparatus, wherein the master attributes include a master key and master IMSI (M-IMSI) shared by the SIM provider apparatus and the SIM container; transmitting the first nonce, signed by the first SPK, to the SIM container over the IP connection; receiving, from the SIM container, the first nonce and a second nonce, signed by a second SPK derived by the SIM container in response to the first nonce, and master attributes stored in the SIM container; and storing the SP-IMSI and the first SPK in response to the first SPK being the same as the second SPK.

In Example 14, the subject matter of Example 13 can further include wherein the SIM provider apparatus emulates a roaming service provider.

In Example 15, the subject matter of Examples 13-14 can further include wherein the IP connection is a secure data tunnel.

In Example 16, the subject matter of Examples 13-15 can further include wherein establishing the roaming connection comprises the SIM provider apparatus receiving the M-IMSI forwarded from a local network service provider.

In Example 17, the subject matter of Examples 13-16 can further include transmitting a command to the local service provider to store the SP-IMSI and the first SPK, in their respective locations, in response to the first SPK being the same as the second SPK.

In Example 18, the subject matter of Examples 13-17 can further include transmitting an acknowledgement to the SIM container to store the second SPK.

In Example 19, the subject matter of Examples 13-18 can further include transmitting the first SPK and owner information to the local service provider.

In Example 20, the subject matter of Examples 13-19 can further include wherein receiving the SP-IMSI is in response to transmitting a request for the SP-IMSI.

In Example 21, the subject matter of Examples 13-20 can further include: receiving, from the device, a request to remove a provisioned network service provider from the SIM container; and removing the SP-IMSI of the provisioned network service provider from the SIM provider apparatus.

In Example 22, the subject matter of Examples 13-21 can further include wherein receiving the request to remove the provisioned network service provider is received over an IP connection.

Example 23 is a non-transitory computer-readable storage medium that stores instructions for execution by one or more processors to perform operations for a SIM provider apparatus, the operations causing the SIM provider apparatus to: derive a first service provider key (SPK) based on master attributes stored at the SIM provider apparatus, wherein the master attributes are also stored in a SIM container; verify a second SPK, received from the SIM container and generated based on the master attributes in the SIM container, is the same as the first SPK; and store the first SPK in response to a successful verification.

In Example 24, the subject matter of Example 23 can further include wherein the operations further cause the SIM provider apparatus to: generate a first nonce; transmit the first nonce, signed by the first SPK, to the SIM container; receive the nonce and a second nonce, generated by the SIM container, that have been signed by the second SPK; compare the first SPK to the second SPK; and send an acknowledgement to the SIM container when the first SPK is the same as the second SPK.

In Example 25, the subject matter of Examples 23-24 can further include wherein the operations further cause the SIM provider apparatus to: establish an Internet Protocol connection between the SIM provider apparatus and the SIM container; transmit the first nonce, signed by the first SPK, to the SIM container over the IP connection; and receive the nonce and the second nonce signed by the second SPK over the IP connection.

In Example 26, the subject matter of Examples 23-25 can further include wherein the operations further cause the SIM provider apparatus to: establish a roaming connection between the SIM provider apparatus and the device.

Example 27 is user equipment (UE) including a subscriber identity module (SIM) container that shares master attributes, including a master key and master IMSI (M-IMSI), with a SIM provider apparatus, the UE and SIM container configured to: establish a roaming connection with a SIM provider apparatus; establish an IP connection with the SIM provider apparatus; receive a service provider International Mobile Subscriber Identity (SP-IMSI) and a first nonce from the SIM provider apparatus over the IP connection, the first nonce signed by a first service provider key (SPK) generated based on the master attributes stored at the SIM provider apparatus; derive a second SPK based on the master attributes stored in the SIM container, the received SP-IMSI, and the first nonce; generate a signature of the first nonce and a second nonce, derived by the SIM container, using the second SPK; transmit the first and second nonces, signed by the second SPK, to the SIM provider apparatus; and store the SP-IMSI and the SPK in the SIM container in response to a verification acknowledgement message received from the SIM provider apparatus.

In Example 28, the subject matter of Example 27 can further include wherein the UE and SIM container are further configured to communicate with the SIM provider apparatus over a secure data tunnel of the IP connection.

What is claimed is:

1. A subscriber identity module (SIM) provider apparatus comprising hardware processing circuitry configured to:
    derive a first service provider key (SPK) based on master attributes, wherein the master attributes comprise a master International Mobile Subscriber Identity (M-IMSI) and include a master key (MK) and are shared by the SIM provider apparatus and a SIM container, wherein the first SPK is derived by a key derivation function (KDF) represented by SPK=KDF (MK, M-IMSI, SP-IMSI, nonce, "SPK_Derivation" wherein SP-IMSI represents a service provider-International Mobile Subscriber Identity;
    sign a first nonce with the first SPK and transmit the signed first nonce to a device having the SIM container;
    receive, from the SIM container, the first nonce and a second nonce;
    verify that the received first and second nonces were signed with a second SPK;
    compare a received signature of the first and second nonces, generated using the second SPK, with the signature of the first SPK, the second nonce generated using the first SPK; and
    send an acknowledgement to the SIM container when the first SPK is the same as the second SPK.

2. The SIM provider apparatus of claim 1, wherein the hardware processing circuitry is further configured to store the SPK in response to a successful verification that the first and second nonces were signed by the SPK.

3. The SIM provider apparatus of claim 1, wherein the hardware processing circuitry is further configured to generate the first SPK with a unidirectional key derivation function.

4. The SIM provider apparatus of claim 1, wherein the SIM provider apparatus is operably coupled to the device over a roaming connection.

5. The SIM provider apparatus of claim 1, wherein the SIM provider apparatus is operably coupled to the SIM container through an Internet Protocol connection.

6. The SIM provider apparatus of claim 5, wherein the hardware processing circuitry is further configured to send a command over the IP connection to the SIM container, wherein the command is configured to initiate generation of the second SPK in the SIM container.

7. The SIM provider apparatus of claim 6, wherein the command comprises a service provider IMSI (SP-IMSI) and the first nonce generated by the SIM provider apparatus, wherein the SIM provider apparatus is further configured to sign the first nonce with the first SPK.

8. The SIM provider apparatus of claim 7, wherein the hardware processing circuitry is further configured to receive the first nonce and the second nonce, derived by the SIM container, wherein the first and second notices are signed by the second SPK.

9. The SIM provider apparatus of claim 1, wherein the SIM container is a SIM card removable from the device, a universal integrated circuit card (UICC), a SIM card soldered into the device, a memory area of the device, or any secure container of the device.

10. A non-transitory computer-readable storage medium that stores instructions for execution by one or more processors of a subscriber identity module (SIM) provider apparatus to perform operations to configure the SIM provider apparatus to:
   derive a first service provider key (SPK) based on master attributes, comprising a Master-International Mobile Subscriber Identity (M-IMSI), that include a master key (MK) and are shared by the SIM provider apparatus and a SIM container operably coupled to a device, wherein the first SPK is derived by a key derivation function (KDF) represented by SPK=KDF(MK, M-IMSI, SP-IMSI, nonce, "SPK_Derivation"), wherein SP-IMSI represents a Service Provider-International Mobile Subscriber Identity;
   sign a first nonce with the first SPK and transmit the signed first nonce to the device;
   receive, from the SIM container, the first nonce and a second nonce;
   verify that the received first and second nonces were signed with a second SPK;
   compare a received signature of the first and second nonces, generated using the second SPK, with the signature of the first and second nonce generated using the first SPK; and
   send an acknowledgement to the SIM container when the first SPK is the same as the second SPK.

11. The non-transitory computer-readable storage medium of claim 10, wherein the operations further configure the SIM provider apparatus to:
   send a command over an Internet Protocol (IP) connection to the SIM container, wherein the command is configured to initiate generation of the second SPK in the SIM container wherein the command comprises the SP-IMSI and the first nonce generated by the SIM provider apparatus, the SIM provider apparatus is further configured to sign the first nonce with the first SPK; and
   receive the first nonce and the second nonce, derived by the SIM container, wherein the first and second nonces are signed by the second SPK.

* * * * *

UNITED STATES PATENT AND TRADEMARK OFFICE
CERTIFICATE OF CORRECTION

PATENT NO. : 9,439,069 B2  
APPLICATION NO. : 14/573132  
DATED : September 6, 2016  
INVENTOR(S) : Sharaga et al.

Page 1 of 1

It is certified that error appears in the above-identified patent and that said Letters Patent is hereby corrected as shown below:

In the Claims

Column 10, Line 45, Claim 1, after ""SPK_Derivation"", insert --),--, therefor

Column 11, Line 20, Claim 8, delete "notices" and insert --nonces--, therefor

Signed and Sealed this
Twenty-first Day of April, 2020

Andrei Iancu
*Director of the United States Patent and Trademark Office*